Figure 1:
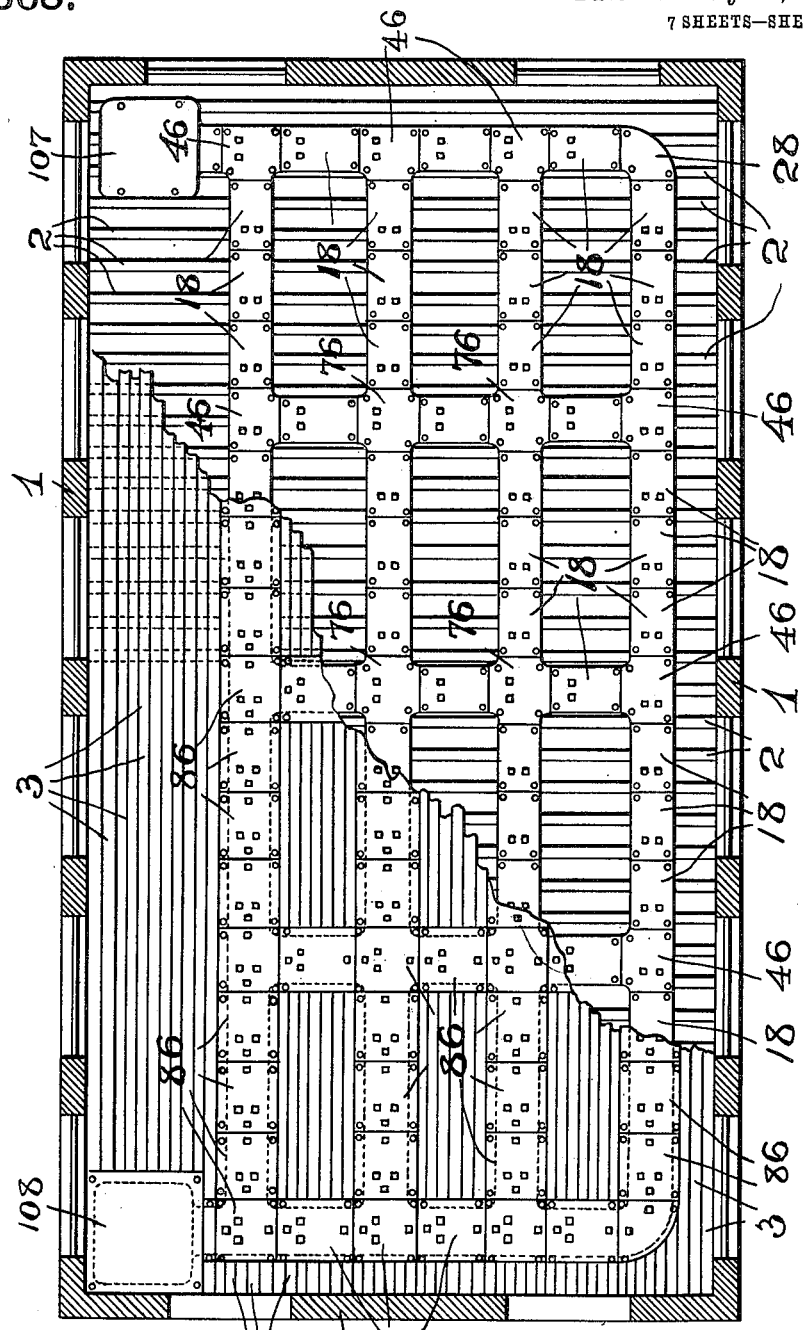

C. W. WACHTEL, Jr.
FLOOR CONDUIT AND DETACHABLE COVER THEREFOR.
APPLICATION FILED DEC. 3, 1908.

922,368.

Patented May 18, 1909.
7 SHEETS—SHEET 1.

WITNESSES:
Fred'k H. W. Fraentzel
Anna H. Alter

INVENTOR:
Charles W. Wachtel Jr.,
BY
Fraentzel and Richards.
ATTORNEYS.

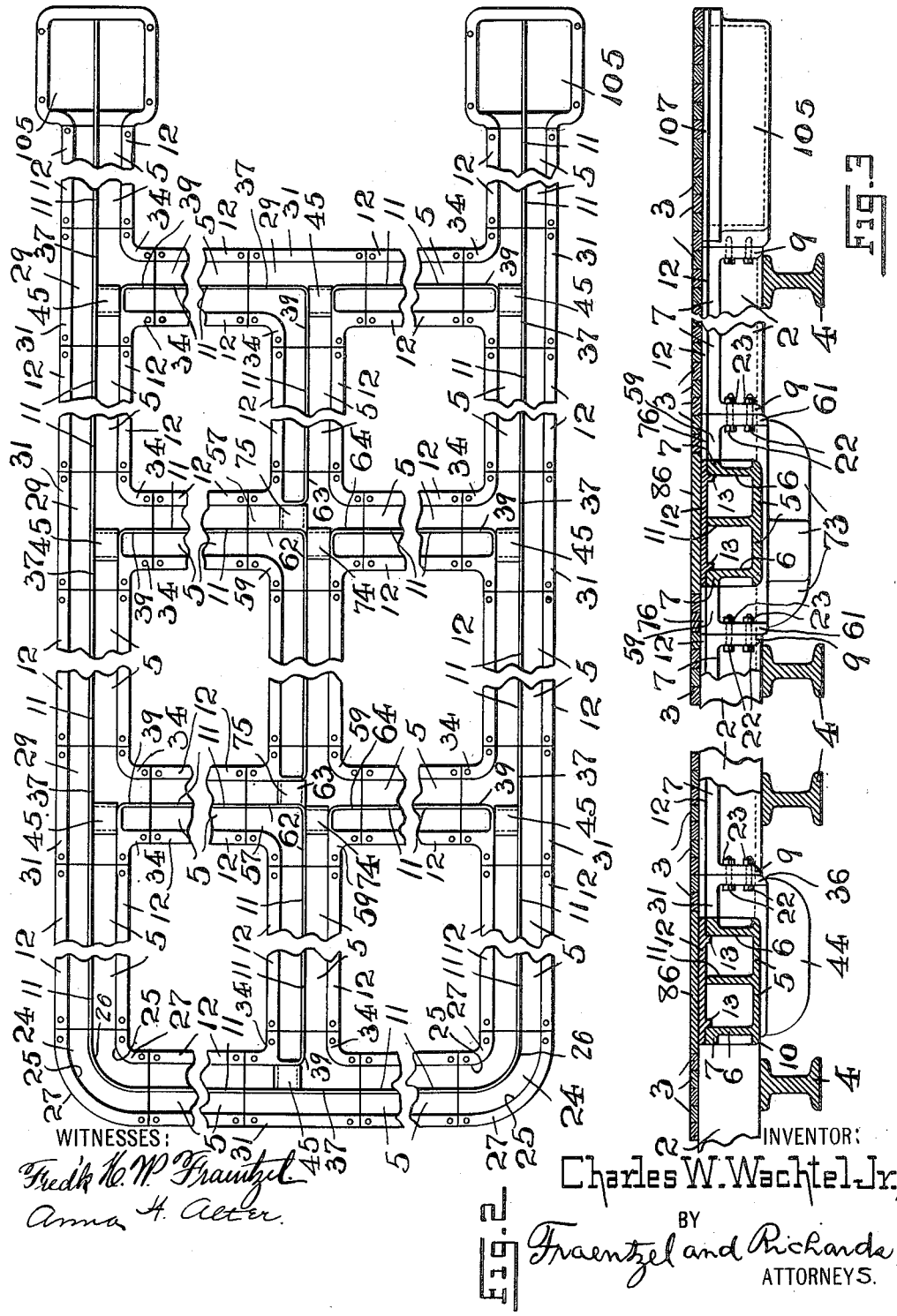

C. W. WACHTEL, Jr.
FLOOR CONDUIT AND DETACHABLE COVER THEREFOR.
APPLICATION FILED DEC. 3, 1908.

922,368.

Patented May 18, 1909.
7 SHEETS—SHEET 3.

WITNESSES:
Fredk H. W. Fraentzel
Anna H. Alter

INVENTOR:
Charles W. Wachtel Jr,
BY
Fraentzel and Richards,
ATTORNEYS.

C. W. WACHTEL, Jr.
FLOOR CONDUIT AND DETACHABLE COVER THEREFOR.
APPLICATION FILED DEC. 3, 1908.
922,368.
Patented May 18, 1909.
7 SHEETS—SHEET 4.
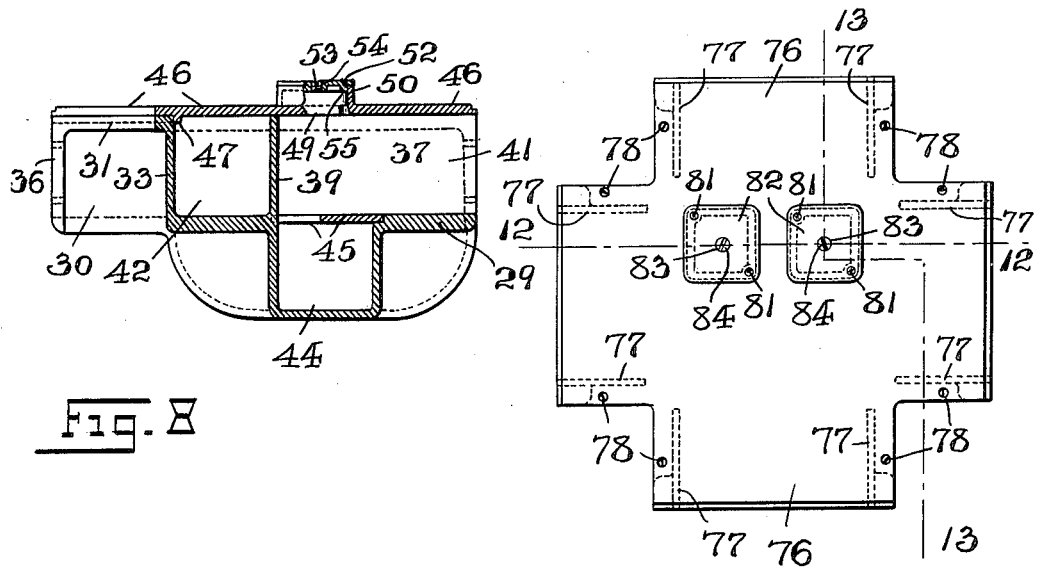
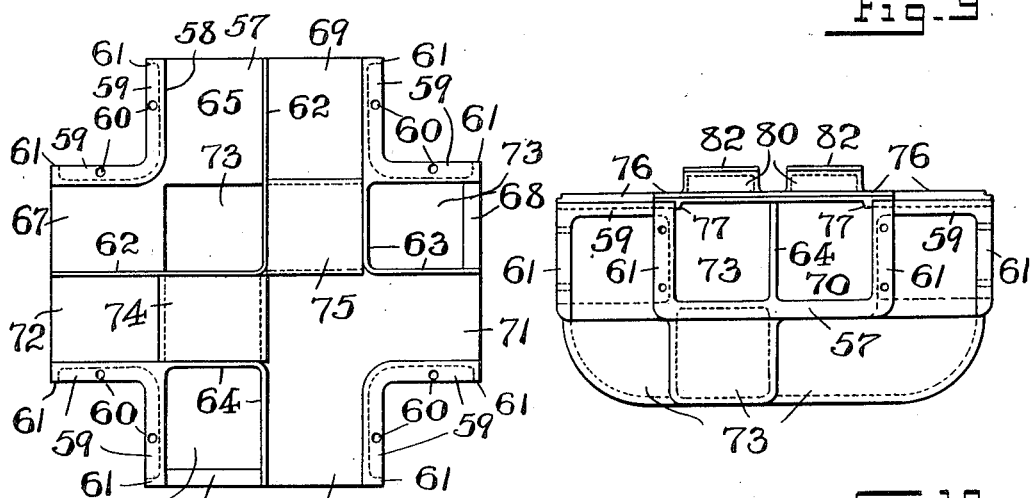
WITNESSES:
Fredk. H. W. Fraentzel
Anna H. Alter
INVENTOR:
Charles W. Wachtel Jr,
BY
Fraentzel and Richards
ATTORNEYS.

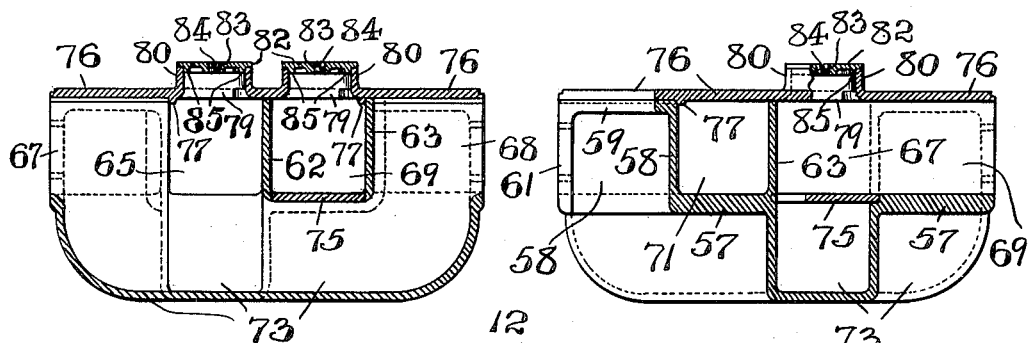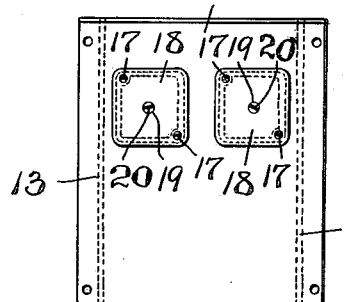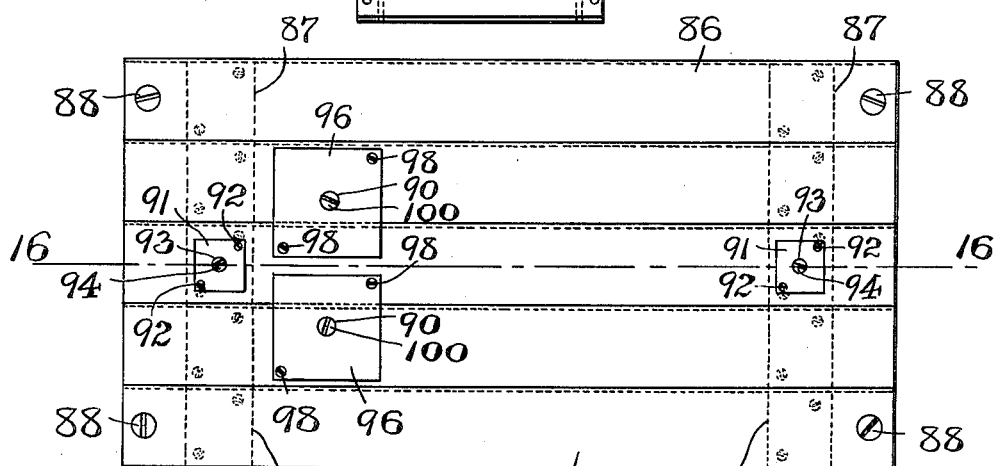

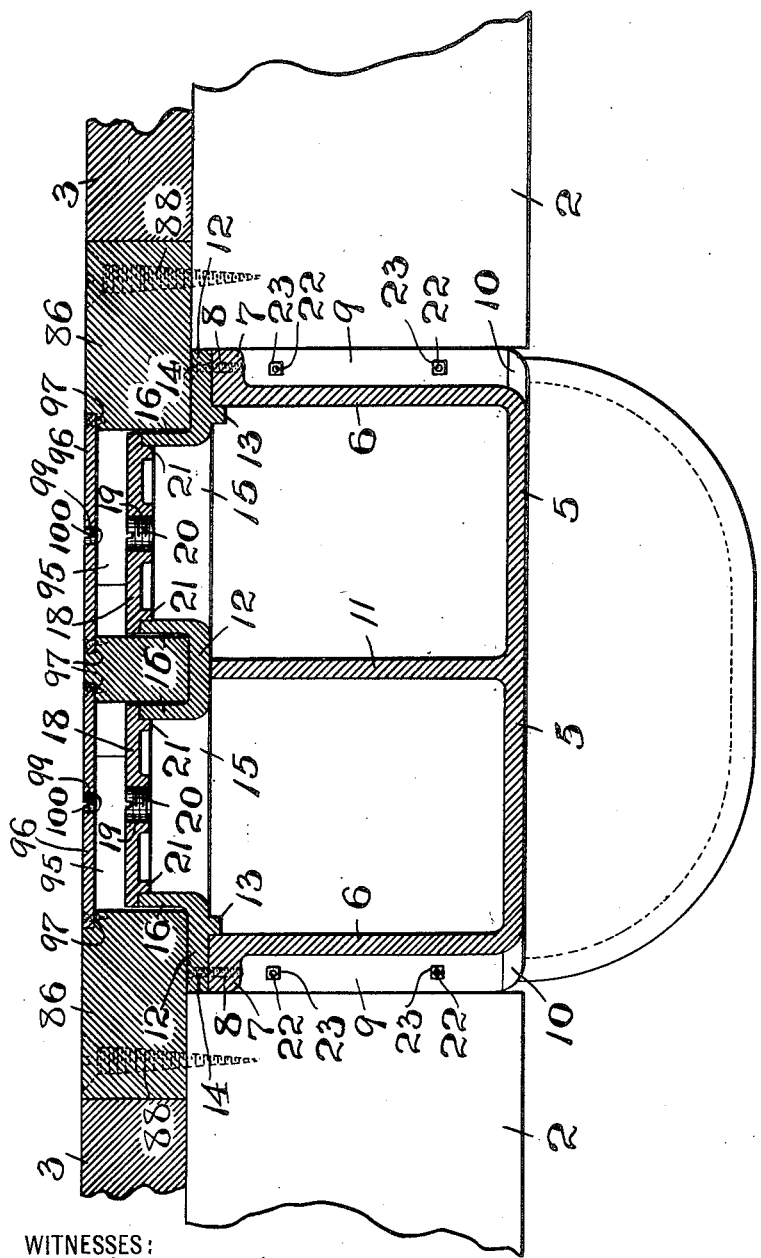

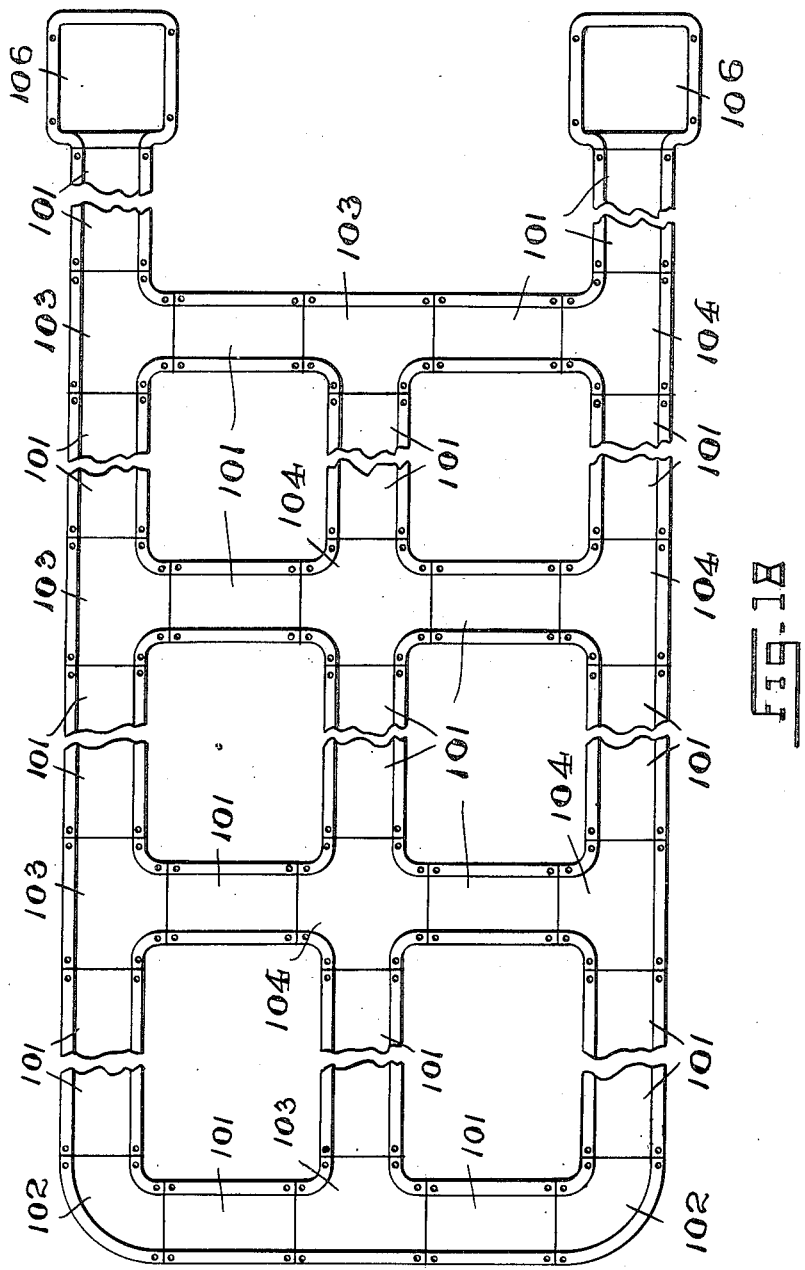

UNITED STATES PATENT OFFICE.

CHARLES W. WACHTEL, JR., OF NEWARK, NEW JERSEY.

FLOOR-CONDUIT AND DETACHABLE COVER THEREFOR.

No. 922,368.　　　　Specification of Letters Patent.　　　　Patented May 18, 1909.

Application filed December 3, 1908. Serial No. 465,795.

*To all whom it may concern:*

Be it known that I, CHARLES W. WACHTEL, Jr., a citizen of the United States, residing at Newark, in the county of Essex and State of New Jersey, have invented certain new and useful Improvements in Floor-Conduits and Detachable Covers Therefor; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, in improvements in electrical conduits for buildings; and, my present invention has reference, more particularly, to a novel construction and novel disposal of conduit-sections or elements which are adapted to be connected so as to provide long ducts or conduits for the arrangement therein of the various kinds of electric cables or wiring, said connected sections being placed in the floor of a building, beneath the floor-boards thereof, and the several conduit-sections being provided with detachable covers, placed beneath floor-covers or traps, separably disposed in the flooring, and the said covers of the conduit-sections being also preferably provided with suitably formed outlets, normally closed by detachable plates or members, located beneath similar plates in the floor-covers or traps, for withdrawing the cables or wires from within the floor-conduit to a point or points above the floor for connection with electrical appliances mounted upon a desk or desks, or other articles of furniture, or places within the room.

My present invention has for its principal object to provide a novel and simply constructed electrical conduit for buildings, adapted to be placed beneath the flooring, and the conduit, as well as portions of the floor-boards there-above, being arranged and constructed in such a manner, so that the arrangement of electric cables and wires within the conduit, as well as the making of electrical connections therewith, may be easily and quickly made, at a minimum expenditure of time and expense; and, furthermore, to provide a means for readily withdrawing the electric wires from within the conduit, at desired points, to points above the flooring for making electrical connections with electrical appliances, mounted upon desks or other furniture, or suitable places within the room, without being compelled to tear up the floor-boards, and possibly destroy the boards so that they have to be replaced with new boards, or that the flooring has to be patched with portions of new boards, thereby resulting in an unsightly and unfinished floor, after the relaying of the flooring.

A further object of my present invention is to provide a novel form of floor-conduit provided with parallel ducts or chambers for the reception of cables or wires carrying electric currents of different degrees of strength, as the electric currents for lighting purposes and those for bell-wiring or signaling purposes; and, furthermore, to provide a novel form of floor-conduit formed with a multiplicity of ducts or members, and depressed duct-portions connecting one main duct with another duct, so that the cables or wires carrying a heavy electric current may be extended from one duct into another duct, without crossing directly into and through a duct in which wires carrying a lighter capacity of electric current are arranged, so that the electric cables or wires can not be brought in direct engagement or contact with each other, and whereby all danger of short-circuiting the electric wires, and any consequent danger resulting from such electrical contact of the crossed wires is completely obviated.

Other objects of this invention not at this time more particularly enumerated will be clearly understood from the following detailed description of the same; and, with the various objects of my present invention in view, the said invention consists, primarily, in the novel floor-conduit and conduit-sections for building hereinafter set forth; and, the invention consists, furthermore, in the novel arrangements and combinations of the various devices and parts, as well as in the details of the construction of the same, all of which will be more fully described in the following specification, and then finally embodied in the clauses of the claims which are appended to and which form an essential part of this specification.

The invention is clearly illustrated in the accompanying drawings, in which:—

Figure 4:
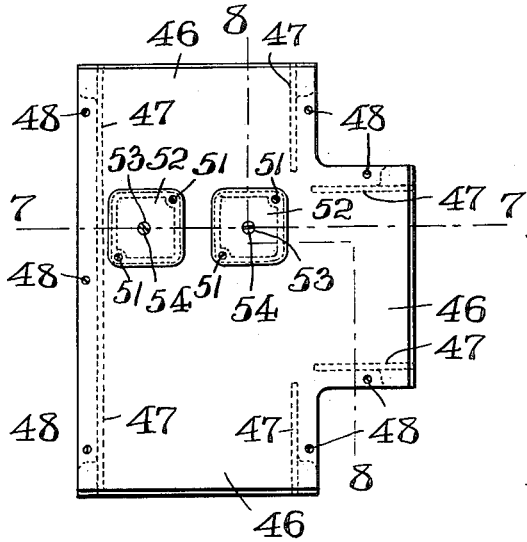
Figure 6:
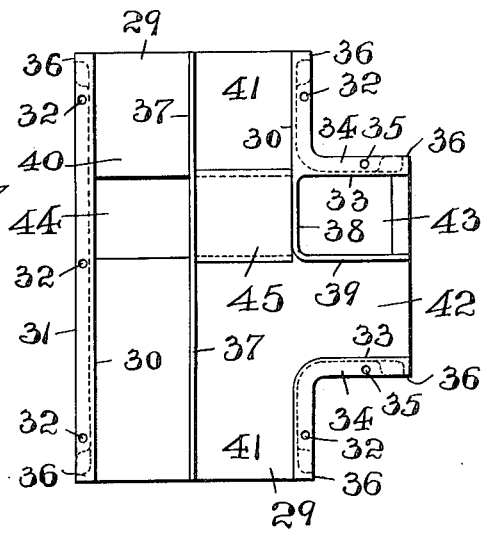
Figure 5:
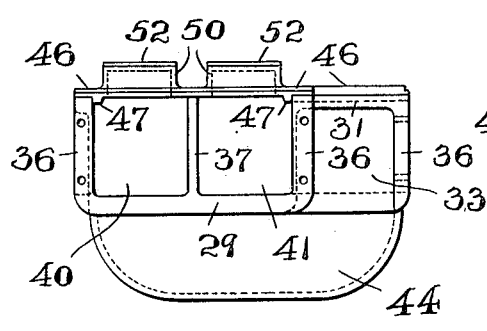
Figure 7:
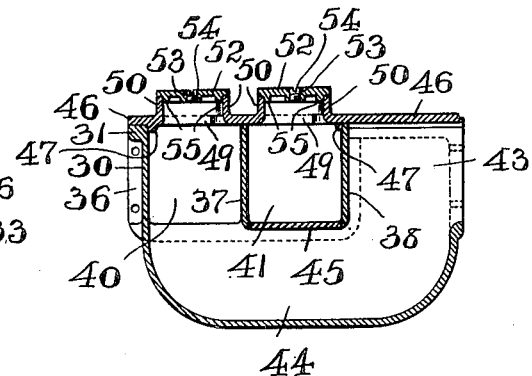

Figure 1 is a horizontal sectional representation of a room, said view showing in connection therewith, and in plan, an arrangement of floor-beams and floor-boards, provided with suitably disposed floor-covers or traps, and said view showing, also in plan, one arrangement of connected conduit-sections and their covers, comprising a floor-conduit embodying the principles of my present invention. Fig. 2 is a top or plan view of a series of conduit-sections, made on an enlarged scale, some of the conduit-sections being represented as being broken away, and the conduit-covers being omitted, to more clearly show the inner arrangement of the parallel conduit-ducts or chambers. Fig. 3 is a transverse sectional representation of a series of connected conduit-sections, showing in connection therewith, and in section, an arrangement of floor-boards and the floor-covers or traps, and also in vertical section the arrangement of the conduit-covers, said view also showing in elevation portions of the floor-beams, and in transverse section an arrangement of metal girders or I-beams upon which the various parts are usually supported. Fig. 4 is a plan view of a T-shaped conduit-section forming part of the floor-conduit; and Fig. 5 is an end view of the same. Fig. 6 is a plan view of the lower chambered body of said section, with the cover removed; Fig. 7 is a transverse section, taken on line 7—7 in said Fig. 4; and Fig. 8 is a similar section, taken on line 8—8 in said Fig. 4. Fig. 9 is a plan view of a cross-shaped conduit-section forming part of the floor-conduit; Fig. 10 is an end view of the same; Fig. 11 is a plan view of the lower chambered body of said section, with the cover removed; Fig. 12 is a transverse section, taken on line 12—12 in said Fig. 9; and Fig. 13 is a similar section, taken on line 13—13 in said Fig. 9. Fig. 14 is a top or plan view of one of the straight conduit-sections forming part of the floor-conduit represented in Figs. 1 and 2. Fig. 15 is a top or plan view of one of the floor-covers or traps; and Fig. 16 is a longitudinal section of the same, said section being taken on line 16—16 in said Fig. 15. Fig. 17 is a cross-section of a conduit-section and its conduit-cover, said view showing in elevation portions of the floor-beams, and in section, portions of the floor-boards, a floor-cover or trap, and an arrangement of outlet-plates in both said conduit-cover and said floor-cover, said view being made on a still larger scale. Fig. 18 is a top or plan view of a series of connected conduit-sections, each provided with a single duct, with the conduit-covers omitted, said view showing a modified form of floor conduit, the same, however, still embodying the principal features of my present invention.

Similar characters of reference are employed in all of the above described views, to indicate corresponding parts.

Referring now to the said figures of the drawings, the reference-characters 1 indicates the walls of any suitable building, 2 the wooden floor-beams, and 3 the usual floor-boards which are arranged upon and secured to the said floor-beams in any usual manner. As shown in Fig. 3 of the drawings, the reference-character 4 indicates the usual I-beams or girders of metal, which are sometimes employed, and upon which the said beams 2 rest and are supported. The electrical conduit which embodies the principles of my present invention comprises any suitable number of conduit-sections, adapted to be secured end to end, in the manner and for the purposes hereinafter more fully described, and which are usually set in concrete or cement, not here shown, and in which the said floor-beams 2 are also embedded, the said concrete or cement being disposed between the metal beams or girders 4 in the usual and well-known manner.

As shown in the several figures of the drawings, and more particularly in Fig. 2, various forms of conduit-sections which go to make up the complete electrical floor-conduit may be employed, the said conduit consisting of a multiplicity of rectangular sections, elbow or L-shaped sections, T-shaped sections, and cross-shaped sections which are all suitably connected and variously arranged so as to provide a series of communicating conduits or ducts, such arrangement being illustrated in Figs. 1 and 2 of the drawings.

From an inspection of said Figs. 2 and 17, it will be seen, that the rectangularly formed sections each consist of a main body 5 formed with upwardly projecting and longitudinally extending side-members or walls 6, having laterally projecting flanges 7 which are provided with bolt or screw-receiving holes or perforations 8. Thus it will be seen that each main body is open at its respective ends and at its top. Each main body 5 is also made at its ends with laterally extending and vertically disposed flanges 9 which are provided with perforations or holes for the purposes hereinafter more fully specified. The said side-members or walls 6 may also be provided at suitable points upon their outer surfaces with laterally extending projections or lugs, as 10, which become thoroughly embedded or incased in the concrete or cement when the latter hardens, so as to thoroughly fix each conduit-section in place against any movement or accidental displacement, as will be clearly understood. The main body 5 of each conduit-section is also made with one or more longitudinally extending walls, as 11, so as to provide suitable chambers or conduit-ducts, as shown, each section in this case being provided with but one wall or partition 11. Suitably secured upon the upper open part of each main body 5, and being preferably of the same length, is a metal conduit-cover 12 formed upon its under face with suitable ribs 13 made to register with the side-members or walls 6 of the main body 5, so that the cover can be easily and quickly fitted in position, as will be evident from an inspection of said Fig. 17. The longitudinal marginal portions of the conduit-cover rest upon the flanges 7 of the said main body 5, being provided with holes or perforations which register with the holes or perforations in said flanges 7 for the reception of suitable screws or bolts, as 14, to secure said cover in place. Each conduit-cover 12 is also made near one of its end-portions with one or more outlet-openings, as 15, the said openings being surrounded by the upwardly extending portions or walls 16; and, resting upon said walls 16 and suitably secured thereto by means of screws 17 are cover-plates 18. Each plate 18 is preferably formed with a centrally disposed screw-threaded opening 19 into which is screwed a screw-threaded stud 20, the upper portion of the stud being preferably flush with the upper surface of the plate 18. Upon its lower face, the said plate 18 may be made with downwardly extending ribs or projections 21 which register with the inner surface-portions of the walls 16, so as to readily dispose the said plate 18 in its closing position upon said walls 16 to close the outlet-opening 15, as will be clearly evident. Any number of said rectangularly formed conduit-sections may be placed end to end, the vertically disposed flanges 9 of one section being fitted upon the corresponding flanges 9 of the next adjacent section, the holes or perforations in the abutting flanges 9 being made to register, and the conduit-sections being secured together or tied end to end by means of suitable bolts 22 and nuts 23, substantially as shown. As shown, if the floor-conduit is to be arranged with an angle, or bend, that is, if the duct or ducts thus provided are to be connected at an angle, as a right angle, to each other, then two of said rectangularly shaped sections are connected by means of an elbow-shaped or an L-shaped conduit-section, see Fig. 2, each section consisting of a correspondingly shaped main body 24 formed with suitably bent or curved side-walls 25 and an intermediate wall or partition 26, which is also suitably curved or bent. The said elbow-shaped body 24 is also made with perforated flanges 27, upon which is arranged and secured in the manner hereinabove described, a correspondingly formed conduit-cover 28, substantially as shown in Fig. 1. The said elbow or L-shaped sections are also made with vertically disposed and perforated flanges which, however, are not shown, because of their similarity to the previously mentioned flanges 9, for operatively connecting the said elbow or L-shaped section to and between a pair of the previously described rectangularly formed conduit-sections described in the foregoing.

When the said floor-conduits are to be arranged in such a manner so as to provide both intermediately disposed longitudinal and lateral ducts, it will be necessary to provide suitably formed T-shaped and cross shaped conduit-sections, as clearly illustrated in the several figures of the drawings. In Figs. 4 to 8 inclusive, I have shown on an enlarged scale one of said T-shaped sections. Each T-shaped section consists, essentially, of a correspondingly shaped main body 29 formed along its longest marginal edge-portion with a side-member or wall 30 formed with a laterally projecting flange 31 provided with bolt or screw-receiving holes or perforations 32. At its opposite edge-portions the said main body 29 is formed with angular side-members or walls 33 having flanges 34 which are provided with holes or perforations 35. Vertical flanges 36 are also provided, said flanges being formed with holes or perforations, for the reception of bolts by means of which the said T-shaped conduit-sections may be suitably connected with and secured between a number of the previously mentioned rectangularly shaped conduit-sections. The main body 29 is also provided with an arrangement of inner walls or partitions, as 37, 38 and 39, so as to provide the duct-portions 40, 41, 42, and 43, the duct-portion 42 communicating directly with the duct-portion 41. To establish a communication between the duct-portion 40 and the duct-portion 43, the said main body 29 is formed with a chambered part 44 which extends in a downward direction from the duct-portion 40 and laterally beneath the duct-portion 41 and then extends upwardly so as to communicate with the duct-portion 43, thus enabling the electrician to draw the cables or wires in the duct-portion 40 over into the duct-portion 43 without coming in contact with any of the wires which may be arranged in the duct-portion 41. If desired, the duct-portion 41 may be made with an opening in communication with the chambered part 44, said opening being ordinarily closed by means of a suitable plate, as 45, but which can be removed to enable the workman to reach down into the chambered part 44, if at any time necessary. Each T-shaped body-section 29 is also provided with a correspondingly formed conduit-cover 46 formed upon its under surface with suitable ribs 47 made to register with the side-members of said body 29, so that the cover can be easily and quickly fitted in position, as will be clearly evident. The edge-portions of said conduit-cover 46 rest upon the flanged portions of said body 29, being provided with holes or perforations which register with the holes or perforations in said flanges for the reception of suitable screws or bolts, as 48, to secure said cover in place. Each conduit-cover 46 is also made near one of its end-portions with one or more outlet-openings, as 49, the said openings being surrounded by upwardly extending portions or walls 50; and, resting upon said walls 50 and suitably secured thereto by means of screws 51 are cover-plates 52. Each plate 52 is preferably formed with a centrally disposed screw-threaded opening 53 into which is screwed a screw-threaded stud 54, the upper portion of the stud being preferably flush with the upper surface of the plate 52. Upon its lower face, the said plate 52 may be made with downwardly extending ribs or projections 55 which register with the inner surface-portions of the walls 50, so as to readily dispose the said plate 52 in its closing position upon said walls 50 to close the outlet opening 49.

Each cross-shaped conduit-section consists, essentially, of a correspondingly shaped main body 57 formed along its marginal edge-portions with side-members or walls 58, each wall being provided with a laterally projecting flange 59 having bolt or screw-receiving holes or perforations 60. The said main body 57 is also made with vertical flanges 61 which are provided with holes or perforations for the reception of bolts by means of which the said cross-shaped conduit-sections may be suitably connected with and secured between a number of the previously mentioned rectangularly shaped conduit-sections. The main body 57 is also provided with an arrangement of inner walls or partitions, as 62, 63 and 64, so as to provide duct-portions or passages 65, 66, 67, 68, 69, 70, 71 and 72, substantially as shown in Fig. 11 of the drawings, the duct-portions 69, 70, 71 and 72 being in direct communication with each other, and the duct-portions 65 communicating directly with the duct-portions 67, as shown. To establish communication between either duct-portion 65 or 67 and the duct-portion 66, and also to establish communication between either duct-portion 65 or 67 and the duct-portion 68, the said main body 57 is provided upon its bottom with a cross-shaped or other suitably shaped chambered part 73 which connects these various duct-portions and extends beneath the directly connected duct-portions 69 and 70, and 71 and 72, to enable the electrician to draw the tires or cables from the duct-portions 65 and 67 into either duct-portion 66 or 68 without crossing the wires in the duct-portions 69 and 70, or 71 and 72. If desired, suitable openings may be left, said openings being ordinarily closed by means of suitable plates, as 74 and 75, but which can be removed to enable the workman to reach down into the chambered part 73, if at any time necessary. Each cross-shaped body-section 57 is also provided with a correspondingly formed conduit-cover 76 formed upon its under surface with suitable ribs 77 made to register with the side-members of the said body 57, so that the cover can be easily and quickly fitted in position, as will be clearly evident. The edge-portions of said conduit-cover 76 rest upon the flanged portions of said body 57, being provided with holes or perforations which register with the holes or perforations in said flanges for the reception of suitable screws or bolts 78, to secure said cover in place. Each conduit-cover 76 is also made near one of its end-portions with one or more outlet-openings, as 79, the said openings being surrounded by upwardly extending portions or walls 80; and, resting upon said walls 80 and suitably secured thereto by means of screws 81 are cover-plates 82. Each plate 82 is preferably formed with a centrally disposed screw-threaded opening 83 into which is screwed a screw-threaded stud 84, the upper portion of the stud being preferably flush with the upper surface of the plate 82. Upon its lower face, the said plate 82 may be made with downwardly extending ribs or projections 85 which register with the inner surface-portions of the walls 80, so as to readily dispose the said plate 82 in its closing position upon said walls 80 to close the outlet-opening 79.

From the foregoing description it will be clearly seen, that by means of the variously formed conduit-sections, connected in the manner set forth, I have provided a suitable floor-conduit in which various electric-cables and wires may be arranged in different chambers or compartments, so that the wires carrying different currents will not be brought in contact with each other to produce dangerous short-circuits, each separate conduit-section being provided with a separable sectional conduit-cover which can be removed so as to expose to the workman, the entire interior of any one or more conduit-sections, and in fact the entire conduit, if desired; or, each conduit-cover being provided with one or more outlets closed by means of the detachable cover-plates or outlet-closing plates, any one or more of such plates may be removed to enable the workman to reach down into the duct-portion of any section for the purposes of drawing or "fishing" the electric wires through the conduit; and, furthermore, by removing the screw-threaded plugs or studs from the said closing plates of the conduit-covers, any wire or wires may be pulled through the opening for the purposes of conveying the same to a suitable point above the flooring.

As will be seen from an inspection of Figs. 1 and 17, in order to permit the removal of the conduit-cover of each conduit-section, without having to tear up the floor-boards 3 to the damage of the flooring, the said flooring may be provided with removable floor-covers or traps, as 86, the same as will be seen from an inspection of Fig. 16 being usually made up of a number of portions of floor-boards, suitably secured together by means of cross-pieces or cleats 87, usually and preferably of metal. These covers or traps 86 are removably arranged, section for section and end to end, in the flooring so as to be located directly above the conduit-covers, the said covers or traps 86, being of greater width than that of the conduit-covers, and their longitudinal edge-portions resting directly upon portions of the wooden floor-beams 2, being suitably secured in place by means of wood-screws 88. Since these covers or traps 86 are tightly fitted in the flooring, to remove the same without marring or damaging the edges of said covers, or of the surrounding floor-boards, by the use of a prying tool, each cover or trap 86 is made in its cross-pieces or cleats 87 with screw-threaded holes 89, each hole 89 being in alinement with a hole 90 formed in the wooden part of the cover or trap. Countersunk into the upper surface of each cover or trap 86 are plates 91, being permanently secured in place by means of screws 92. Each plate 91 is also made with a screw-threaded hole 93 in alinement with the holes 89 and 90, each hole being preferably closed with a screw-threaded plug 94. To remove the cover or trap 86 from the opening in the flooring, so as to permit the workman to get at and remove the corresponding conduit-cover, he simply removes the two screw-threaded plugs 94, and then screws into their places, the correspondingly screw-threaded shanks of a pair of lifting-implements, provided with suitable hand-pieces, by means of which the cover or trap 86 can be readily raised, as will be clearly evident. The said cover or trap 86, as will be seen from Figs. 15 and 17, may also be provided with openings 95, corresponding to the outlet-openings in the said conduit-covers, each opening 95 being closed by means of a detachably secured closing-plate 96 having its marginal edge-portions resting in a depressed part 97 of the main cover or trap 86 and secured in place by means of screws 98. Each plate 96 is also provided with a screw-threaded hole 99, normally closed by means of a screw-threaded plug 100, which can be removed for pulling the electric wires therethrough for making electrical connection with electrical appliances in the room, or for screwing the screw-threaded shank of a lifting implement into the same, so as to remove the plate 96 when the screws 98 have been removed, as will be clearly evident.

From the foregoing description of my present invention it will be seen that I have devised a novel, simple and useful floor-conduit for buildings, which can be easily got at for the drawing through the conduit-ducts of the electric cables or wires, or for making electrical connections with the cables or wires, and for bringing the wires, at different points in the flooring, to desks or other pieces of furniture in a room, without destroying or marring any portion or portions of the floor; and, furthermore, the conduit-covers, as well as the floor-covers or traps being reversible, the positions of the outlets from any one or all of the conduit-sections can be changed so as to suit any change of location of a desk or desks in the room, without being compelled to tear up the floor-boards, the connecting wires leading from the conduit in each instance entering the desk at a suitable point beneath, or directly at the back of the desk.

Referring now to Fig. 18 of the drawings, I have shown therein a floor-conduit having but a single duct-portion, the said conduit being made up of any number of rectangularly shaped conduit-sections 101, a number of elbow or L-shaped conduit-sections 102, a number of T-shaped conduit-sections 103, and a number of cross-shaped conduit-sections 104, all of which are of the general construction of the previously described conduit-sections, and are similarly secured in their connected relations, the internally disposed walls or partitions and the lowered cross-over ducts or elements, however, being omitted, because these features are not necessary in this form of floor-conduit.

As shown in Fig. 2, suitable inlet-boxes, as 105, or 106 as in Fig. 18, may also be provided, said boxes being closed by means of box-covers 107, over which are arranged suitable floor-covers or traps 108, substantially as indicated in Fig. 1 of the drawings.

I am aware that changes may be made in the arrangements and combinations of the various devices and parts, as well as in the details of the construction of the same, without departing from the scope of my present invention as set forth in the foregoing specification, and as defined in the claims thereto appended. Hence I do not limit my invention to the exact arrangements and combinations of the devices and parts as described in the said specification, nor do I confine myself to the exact details of the construction of the said parts, as illustrated in the accompanying drawings.

I claim:—

1. A floor-conduit for buildings comprising a multiplicity of conduit-sections, each section being formed with open ends and an open top, means for securing said sections end to end, and a conduit-cover detachably secured upon each section, each conduit-cover being formed with an outlet opening surrounded by an upwardly extending wall-portion, a closing plate detachably secured upon said wall-portion, said plate being provided with a screw-threaded hole, and a screw-threaded plug removably arranged in said hole.

2. A floor-conduit for buildings comprising a multiplicity of conduit-sections, each section consisting of a main body and side-walls, and being formed with open ends and an open top, a dividing wall extending upwardly from said main body, means for securing said sections end to end, a conduit-cover detachably secured upon each section, each conduit-cover being formed with an outlet opening surrounded by an upwardly extending wall-portion, and a closing-plate detachably secured upon said wall-portion.

3. A floor-conduit for buildings comprising a multiplicity of conduit-sections, each section consisting of a main body and side-walls, and being formed with open ends and an open top, a dividing wall extending upwardly from said main body, means for securing said sections end to end, a conduit-cover detachably secured upon each section, each conduit-cover being formed with an outlet opening surrounded by an upwardly extending wall-portion, a closing-plate detachably secured upon said wall-portion, said plate being provided with a screw-threaded hole, and a screw-threaded plug removably arranged in said hole.

4. A floor-conduit for buildings comprising a multiplicity of conduit-sections, each section consisting of a main body and side-walls, and being formed with open ends and an open top, laterally extending flanges at the upper edges of said side-walls, vertical flanges at the ends of each section, means for securing the vertical flanges of one section upon the vertical flanges of another section, and a conduit-cover detachably secured upon the flanges of said side-walls, each conduit-cover being formed with an outlet opening surrounded by an upwardly extending wall-portion, and a closing-plate detachably secured upon said wall portion.

5. A floor-conduit for buildings comprising a multiplicity of conduit-sections, each section consisting of a main body and side-walls, and being formed with open ends and an open top, laterally extending flanges at the upper edges of said side-walls, vertical flanges at the ends of each section, means for securing the vertical flanges of one section upon the vertical flanges of another section, a conduit-cover detachably secured upon the flanges of said side-walls, each conduit-cover being formed with an outlet opening surrounded by an upwardly extending wall-portion, a closing-plate detachably secured upon said wall-portion, said plate being provided with a screw-threaded hole, and a screw-threaded plug removably arranged in said hole.

6. A floor-conduit for buildings, comprising a multiplicity of conduit-sections, each section consisting of a main body and side-walls, and being formed with open ends and an open top, laterally extending flanges at the upper edges of said side-walls, vertical flanges at the ends of each section, means for securing the vertical flanges of one section upon the vertical flanges of another section, a dividing wall extending upwardly from said main body, and a conduit-cover detachably secured upon the flanges of said side-walls.

7. A floor-conduit for buildings, comprising a multiplicity of conduit-sections, each section consisting of a main body and side-walls, and being formed with open ends and an open top, laterally extending flanges at the upper edges of said side-walls, vertical flanges at the ends of each section, means for securing the vertical flanges of one section upon the vertical flanges of another section, a dividing wall extending upwardly from said main body, and a conduit-cover detachably secured upon the flanges of said side-walls, each conduit-cover being formed with an outlet opening surrounded by an upwardly extending wall-portion, and a closing-plate detachably secured upon said wall-portion.

8. A floor-conduit for buildings, comprising a multiplicity of conduit-sections, each section consisting of a main body and side-walls, and being formed with open ends and an open top, laterally extending flanges at the upper edges of said side-walls, vertical flanges at the ends of each section, means for securing the vertical flanges of one section upon the vertical flanges of another section, a dividing wall extending upwardly from said main body, a conduit-cover detachably secured upon the flanges of said side-walls, each conduit-cover being formed with an outlet opening surrounded by an upwardly extending wall-portion, a closing-plate detachably secured upon said wall-portion, said plate being provided with a screw-threaded hole, and a screw-threaded plug removably arranged in said hole.

9. A floor-conduit for buildings comprising a multiplicity of conduit-sections, each section being formed with open ends and an open top, means for securing said sections end to end, and a conduit-cover detachably secured upon each section, combined with the floor-beams and floor-boards, and floor-covers detachably secured to said floor-beams, directly over each conduit-cover, substantially as and for the purposes set forth.

10. A floor-conduit for buildings comprising a multiplicity of conduit-sections, each section being formed with open ends and an open top, means for securing said sections end to end, and a conduit-cover detachably secured upon each section, each conduit-cover being formed with an outlet opening surrounded by an upwardly extending wall-portion, and a closing-plate detachably secured upon said wall-portion, combined with the floor-beams and floor-boards, and floor-covers detachably secured to said floor-beams, directly over each conduit-cover, substantially as and for the purposes set forth.

11. A floor-conduit for buildings comprising a multiplicity of conduit-sections, each section being formed with open ends and an open top, means for securing said sections end to end, and a conduit-cover detachably secured upon each section, each conduit-cover being formed with an outlet opening surrounded by an upwardly extending wall-portion, a closing-plate detachably secured upon said wall-portion, said plate being provided with a screw-threaded hole, and a screw-threaded plug removably arranged in said hole, combined with the floor-beams and floor-boards, and floor-covers detachably secured to said floor-beams, directly over each conduit-cover, substantially as and for the purposes set forth.

12. A floor-conduit for buildings comprising a multiplicity of conduit-sections, each section consisting of a main body and side-walls, and being formed with open ends and an open top, a dividing wall extending upwardly from said main body, means for securing said sections end to end, and a conduit-cover detachably secured upon each section, combined with the floor-beams and floor-boards, and floor-covers detachably secured to said floor-beams directly over each conduit-cover, substantially as and for the purposes set forth.

13. A floor-conduit for buildings comprising a multiplicity of conduit-sections, each section consisting of a main body and side-walls, and being formed with open ends and an open top, a dividing wall extending upwardly from said main body, means for securing said sections end to end, a conduit-cover detachably secured upon each section, each conduit-cover being formed with an outlet opening surrounded by an upwardly extending wall-portion, and a closing-plate detachably secured upon said wall-portion, combined with the floor-beams and floor-boards, and floor-covers detachably secured to said floor-beams, directly over each conduit-cover, substantially as and for the purposes set forth.

14. A floor-conduit for buildings comprising a multiplicity of conduit-sections, each section consisting of a main body and side-walls, and being formed with open ends and an open top, a dividing wall extending upwardly from said main body, means for securing said sections end to end, a conduit-cover detachably secured upon each section, each conduit-cover being formed with an outlet opening surrounded by an upwardly extending wall-portion, a closing-plate detachably secured upon said wall-portion, said plate being provided with a screw-threaded hole, and a screw-threaded plug removably arranged in said hole, combined with the floor-beams and floor-boards, and floor-covers detachably secured to said floor-beams, directly over each conduit-cover, substantially as and for the purposes set forth.

15. A floor-conduit for buildings comprising a multiplicity of conduit-sections, each section consisting of a main body and side-walls, and being formed with open ends and an open top, laterally extending flanges at the upper edges of said side-walls, vertical flanges at the ends of each section, means for securing the vertical flanges of one section upon the vertical flanges of another section, and a conduit-cover detachably secured upon the flanges of said side-walls, combined with the floor-beams and floor-boards, and floor-covers detachably secured to said floor-beams, directly over each conduit-cover, substantially as and for the purposes set forth.

16. A floor-conduit for buildings comprising a multiplicity of conduit-sections, each section consisting of a main body and side-walls, and being formed with open ends and an open top, laterally extending flanges at the upper edges of said side-walls, vertical flanges at the ends of each section, means for securing the vertical flanges of one section upon the vertical flanges of another section, and a conduit-cover detachably secured upon the flanges of said side-walls, each conduit-cover being formed with an outlet opening surrounded by an upwardly extending wall-portion, and a closing plate detachably secured upon said wall-portion, combined with the floor-beams and floor-boards, and floor-covers detachably secured to said floor-beams, directly over each conduit-cover, substantially as and for the purposes set forth.

17. A floor-conduit for buildings comprising a multiplicity of conduit-sections, each section consisting of a main body and side-walls, and being formed with open ends and an open top, laterally extending flanges at the upper edges of said side-walls, vertical flanges at the ends of each section, means for securing the vertical flanges of one section upon the vertical flanges of another section, a conduit-cover detachably secured upon the flanges of said side-walls, each conduit-cover being formed with an outlet opening surrounded by an upwardly extending wall-portion, a closing-plate detachably secured upon said wall-portion, said plate being provided with a screw-threaded hole, and a screw-threaded plug removably arranged in said hole, combined with the floor-beams and floor-boards, and floor-covers detachably secured to said floor-beams, directly over each conduit-cover, substantially as and for the purposes set forth.

18. A floor-conduit for buildings, comprising a multiplicity of conduit-sections, each section consisting of a main body and side-walls, and being formed with open ends and an open top, laterally extending flanges at the upper edges of said side-walls, vertical flanges at the ends of each section, means for securing the vertical flanges of one section upon the vertical flanges of another section, a dividing wall extending upwardly from said main body, and a conduit-cover detachably secured upon the flanges of said side-walls, combined with the floor-beams and floor-boards, and floor-covers detachably secured to said floor-beams, directly over each conduit-cover, substantially as and for the purposes set forth.

19. A floor-conduit for buildings, comprising a multiplicity of conduit-sections, each section consisting of a main body and side-walls, and being formed with open ends and an open top, laterally extending flanges at the upper edges of said side-walls, vertical flanges at the ends of each section, means for securing the vertical flanges of one section upon the vertical flanges of another section, a dividing wall extending upwardly from said main body, and a conduit-cover detachably secured upon the flanges of said side-walls, each conduit-cover being formed with an outlet opening surrounded by an upwardly extending wall-portion, and a closing-plate detachably secured upon said wall-portion, combined with the floor-beams and floor-boards, and floor-covers detachably secured to said floor-beams, directly over each conduit-cover, substantially as and for the purposes set forth.

20. A floor-conduit for buildings, comprising a multiplicity of conduit-sections, each section consisting of a main body and side-walls, and being formed with open ends and an open top, laterally extending flanges at the upper edges of said side-walls, vertical flanges at the ends of each section, means for securing the vertical flanges of one section upon the vertical flanges of another section, a dividing wall extending upwardly from said main body, a conduit-cover detachably secured upon the flanges of said side-walls, each conduit-cover being formed with an outlet opening surrounded by an upwardly extending wall-portion, a closing-plate detachably secured upon said wall-portion, said plate being provided with a screw-threaded hole, and a screw-threaded plug removably arranged in said hole, combined with the floor-beams and floor-boards, and floor-covers detachably secured to said floor-beams, directly over each conduit-cover, substantially as and for the purposes set forth.

21. A floor-conduit for buildings comprising a multiplicity of conduit-sections, each section being formed with open ends and an open top, means for securing said sections end to end, and a conduit-cover detachably secured upon each section, combined with the floor-beams and floor-boards, and floor-covers detachably secured to said floor-beams directly over each conduit-cover, each floor-cover being formed with an opening, and a plate detachably secured over the opening in each floor-cover, substantially as and for the purposes set forth.

22. A floor-conduit for buildings, comprising a multiplicity of conduit-sections, each section being formed with open ends and an open top, means for securing said sections end to end, and a conduit-cover detachably secured upon each section, each conduit-cover being formed with an outlet opening surrounded by an upwardly extending wall-portion, and a closing-plate detachably secured upon said wall-portion combined with the floor-beams and floor-boards, and floor-covers detachably secured to said floor-beams directly over each conduit-cover, each floor-cover being formed with an opening, and a plate detachably secured over the opening in each floor-cover, substantially as and for the purposes set forth.

23. A floor-conduit for buildings comprising a multiplicity of conduit-sections, each section being formed with open ends and an open top, means for securing said sections end to end, and a conduit-cover detachably secured upon each section, each conduit-cover being formed with an outlet opening surrounded by an upwardly extending wall-portion, a closing plate detachably secured upon said wall-portion, said plate being provided with a screw-threaded hole, and a screw-threaded plug removably arranged in said hole, combined with the floor-beams and floor-boards, and floor-covers detachably secured to said floor-beams directly over each conduit-cover, each floor-cover being formed with an opening, and a plate detachably secured over the opening in each floor-cover, substantially as and for the purposes set forth.

24. A floor-conduit for buildings comprising a multiplicity of conduit-sections, each section consisting of a main body and side-walls, and being formed with open ends and an open top, a dividing wall extending upwardly from said main body, means for securing said sections end to end, and a conduit-cover detachably secured upon each section, combined with the floor-beams and floor-boards, and floor-covers detachably secured to said floor-beams directly over each conduit-cover, each floor-cover being formed with an opening, and a plate detachably secured over the opening in each floor-cover, substantially as and for the purposes set forth.

25. A floor-conduit for buildings comprising a multiplicity of conduit-sections, each section consisting of a main body and side-walls, and being formed with open ends and an open top, a dividing wall extending upwardly from said main body, means for securing said sections end to end, a conduit-cover detachably secured upon each section, each conduit-cover being formed with an outlet opening surrounded by an upwardly extending wall-portion, and a closing-plate detachably secured upon said wall-portion, combined with the floor-beams and floor-boards, and floor-covers detachably secured to said floor-beams directly over each conduit-cover, each floor-cover being formed with an opening, and a plate detachably secured over the opening in each floor-cover, substantially as and for the purposes set forth.

26. A floor-conduit for buildings comprising a multiplicity of conduit-sections, each section consisting of a main body and side-walls, and being formed with open ends and an open top, a dividing wall extending upwardly from said main body, means for securing said sections end to end, a conduit-cover detachably secured upon each section, each conduit-cover being formed with an outlet opening surrounded by an upwardly extending wall-portion, a closing-plate detachably secured upon said wall-portion, said plate being provided with a screw-threaded hole, and a screw-threaded plug removably arranged in said hole, combined with the floor-beams and floor-boards, and floor-covers detachably secured to said floor-beams directly over each conduit-cover, each floor-cover being formed with an opening, and a plate detachably secured over the opening in each floor-cover, substantially as and for the purposes set forth.

27. A floor-conduit for buildings comprising a multiplicity of conduit-sections, each section consisting of a main body and side-walls, and being formed with open ends and an open top, laterally extending flanges at the upper edges of said side-walls, vertical flanges at the ends of each section, means for securing the vertical flanges of one section upon the vertical flanges of another section, and a conduit-cover detachably secured upon the flanges of said side-walls, combined with the floor-beams and floor-boards, and floor-covers detachably secured to said floor-beams directly over each conduit-cover, each floor-cover being formed with an opening, and a plate detachably secured over the opening in each floor-cover, substantially as and for the purposes set forth.

28. A floor-conduit for buildings comprising a multiplicity of conduit-sections, each section consisting of a main body and side-walls, and being formed with open ends and an open top, laterally extending flanges at the upper edges of said side-walls, vertical flanges at the ends of each section, means for securing the vertical flanges of one section upon the vertical flanges of another section, and a conduit-cover detachably secured upon the flanges of said side-walls, each conduit-cover being formed with an outlet opening surrounded by an upwardly extending wall-portion, and a closing-plate detachably secured upon said wall-portion, combined with the floor-beams and floor-boards, and floor-covers detachably secured to said floor-beams directly over each conduit-cover, each floor-cover being formed with an opening, and a plate detachably secured over the opening in each floor-cover, substantially as and for the purposes set forth.

29. A floor-conduit for buildings comprising a multiplicity of conduit-sections, each section consisting of a main body and side-walls, and being formed with open ends and an open top, laterally extending flanges at the upper edges of said side-walls, vertical flanges at the ends of each section, means for securing the vertical flanges of one section upon the vertical flanges of another section, a conduit-cover detachably secured upon the flanges of said side-walls, each conduit-cover being formed with an outlet opening surrounded by an upwardly extending wall-portion, a closing plate detachably secured upon said wall-portion, said plate being provided with a screw-threaded hole, and a screw-threaded plug removably arranged in said hole, combined with the floor-beams and floor-boards, and floor-covers detachably secured to said floor-beams directly over each conduit-cover, each floor-cover being formed with an opening, and a plate detachably secured over the opening in each floor-cover, substantially as and for the purposes set forth.

30. A floor-conduit for buildings, comprising a multiplicity of conduit-sections, each section consisting of a main body and side-walls, and being formed with open ends and an open top, laterally extending flanges at the upper edges of said side-walls, vertical flanges at the ends of each section, means for securing the vertical flanges of one section upon the vertical flanges of another section, a dividing wall extending upwardly from said main body, and a conduit-cover detachably secured upon the flanges of said side-walls, combined with the floor-beams and floor-boards, and a floor-cover detachably secured to said floor-beams directly over each conduit-cover, each floor-cover being formed with an opening, and a plate detachably secured over the opening in each floor-cover, substantially as and for the purposes set forth.

31. A floor-conduit for buildings, comprising a multiplicity of conduit-sections, each section consisting of a main body and side-walls, and being formed with open ends and an open top, laterally extending flanges at the upper edges of said side-walls, vertical flanges at the ends of each section, means for securing the vertical flanges of one section upon the vertical flanges of another section, a dividing wall extending upwardly from said main body, and a conduit-cover detachably secured upon the flanges of said side-walls, each conduit-cover being formed with an outlet opening surrounded by an upwardly extending wall-portion, and a closing-plate detachably secured upon said wall-portion, combined with the floor-beams and floor-boards, and floor-covers detachably secured to said floor-beams directly over each conduit-cover, each floor-cover being formed with an opening, and a plate detachably secured over the opening in each floor-cover, substantially as and for the purposes set forth.

32. A floor-conduit for buildings, comprising a multiplicity of conduit-sections, each section consisting of a main body and side-walls, and being formed with open ends and an open top, laterally extending flanges at the upper edges of said side-walls, vertical flanges at the ends of each section, means for securing the vertical flanges of one section upon the vertical flanges of another section, a dividing wall extending upwardly from said main body, a conduit-cover detachably secured upon the flanges of said side-walls, each conduit-cover being formed with an outlet opening surrounded by an upwardly extending wall-portion, a closing-plate detachably secured upon said wall-portion, said plate being provided with a screw-threaded hole, and a screw-threaded plug removably arranged in said hole, combined with the floor-beams and floor-boards, and floor-covers detachably secured to said floor-beams directly over each conduit-cover, each floor-cover being formed with an opening, and a plate detachably secured over the opening in each floor-cover, substantially as and for the purposes set forth.

33. A floor-conduit for buildings comprising a multiplicity of conduit-sections, each section being formed with open ends and an open top, means for securing said sections end to end, and a conduit-cover detachably secured upon each section, combined with floor-beams and floor-boards, and floor-covers detachably secured to said floor-beams directly over each conduit-cover, each floor-cover being formed with an opening, a plate detachably secured over the opening in each floor-cover, each plate being provided with a screw-threaded hole, and a screw-threaded plug removably arranged in each hole, substantially as and for the purposes set forth.

34. A floor-conduit for buildings, comprising a multiplicity of conduit-sections, each section being formed with open ends and an open top, means for securing said sections end to end, and a conduit-cover detachably secured upon each section, each conduit-cover being formed with an outlet opening surrounded by an upwardly extending wall-portion, and a closing-plate detachably secured upon said wall-portion, combined with floor-beams and floor-boards, and floor-covers detachably secured to said floor-beams directly over each conduit-cover, each floor-cover being formed with an opening, a plate detachably secured over the opening in each floor-cover, each plate being provided with a screw-threaded hole, and a screw-threaded plug removably arranged in each hole, substantially as and for the purposes set forth.

35. A floor-conduit for buildings comprising a multiplicity of conduit-sections, each section being formed with open ends and an open top, means for securing said sections end to end, and a conduit-cover detachably secured upon each section, each conduit-cover being formed with an outlet opening surrounded by an upwardly extending wall-portion, a closing plate detachably secured upon said wall-portion, said plate being provided with a screw-threaded hole, and a screw-threaded plug removably arranged in said hole, combined with floor-beams and floor-boards, and floor-covers detachably secured to said floor-beams directly over each conduit-cover, each floor-cover being formed with an opening, a plate detachably secured over the opening in each floor-cover, each plate being provided with a screw-threaded hole, and a screw-threaded plug removably arranged in each hole, substantially as and for the purposes set forth.

36. A floor-conduit for buildings comprising a multiplicity of conduit-sections, each section consisting of a main body and side-walls, and being formed with open ends and an open top, a dividing wall extending upwardly from said main body, means for securing said sections end to end, and a conduit-cover detachably secured upon each section, combined with floor-beams and floor-boards, and floor-covers detachably secured to said floor-beams directly over each conduit-cover, each floor-cover being formed with an opening, a plate detachably secured over the opening in each floor-cover, each plate being provided with a screw-threaded hole, and a screw-threaded plug removably arranged in each hole, substantially as and for the purposes set forth.

37. A floor-conduit for buildings comprising a multiplicity of conduit-sections, each section consisting of a main body and side-walls, and being formed with open ends and an open top, a dividing wall extending upwardly from said main body, means for securing said sections end to end, a conduit-cover detachably secured upon each section, each conduit-cover being formed with an outlet opening, surrounded by an upwardly extending wall-portion, and a closing-plate detachably secured upon said wall-portion, combined with floor-beams and floor-boards, and floor-covers detachably secured to said floor-beams directly over each conduit-cover, each floor-cover being formed with an opening, a plate detachably secured over the opening in each floor-cover, each plate being provided with a screw-threaded hole, and a screw-threaded plug removably arranged in each hole, substantially as and for the purposes set forth.

38. A floor-conduit for buildings comprising a multiplicity of conduit-sections, each section consisting of a main body and side-walls, and being formed with open ends and an open top, a dividing wall extending upwardly from said main body, means for securing said sections end to end, a conduit-cover detachably secured upon each section, each conduit-cover being formed with an outlet opening surrounded by an upwardly extending wall-portion, a closing-plate detachably secured upon said wall-portion, said plate being provided with a screw-threaded hole, and a screw-threaded plug removably arranged in said hole, combined with floor-beams and floor-boards, and floor-covers detachably secured to said floor-beams directly over each conduit-cover, each floor-cover being formed with an opening, a plate detachably secured over the opening in each floor-cover, each plate being provided with a screw-threaded hole, and a screw-threaded plug removably arranged in each hole, substantially as and for the purposes set forth.

39. A floor-conduit for buildings comprising a multiplicity of conduit-sections, each section consisting of a main body and side-walls, and being formed with open ends and an open top, laterally extending flanges at the upper edges of said slide-walls, vertical flanges at the ends of each section, means for securing the vertical flanges of one section upon the vertical flanges of another section, and a conduit-cover detachably secured upon the flanges of said side-walls, combined with floor-beams and floor-boards, and floor-covers detachably secured to said floor-beams directly over each conduit-cover, each floor-cover being formed with an opening, a plate detachably secured over the opening in each floor-cover, each plate being provided with a screw-threaded hole, and a screw-threaded plug removably arranged in each hole, substantially as and for the purposes set forth.

40. A floor-conduit for buildings comprising a multiplicity of conduit-sections, each section consisting of a main body and side-walls, and being formed with open ends and an open top, laterally extending flanges at the upper edges of said side-walls, vertical flanges at the ends of each section, means for securing the vertical flanges of one section upon the vertical flanges of another section, and a conduit-cover detachably secured upon the flanges of said side-walls, each conduit-cover being formed with an outlet opening surrounded by an upwardly extending wall-portion, and a closing-plate detachably secured upon said wall-portion, combined with floor-beams and floor-boards, and floor-covers detachably secured to said floor-beams directly over each conduit-cover, each floor-cover being formed with an opening, a plate detachably secured over the opening in each floor-cover, each plate being provided with a screw-threaded hole, and a screw-threaded plug removably arranged in each hole, substantially as and for the purposes set forth.

41. A floor-conduit for buildings comprising a multiplicity of conduit-sections, each section consisting of a main body and side-walls, and being formed with open ends and an open top, laterally extending flanges at the upper edges of said side-walls, vertical flanges at the ends of each section, means for securing the vertical flanges of one section upon the vertical flanges of another section, a conduit-cover detachably secured upon the flanges of said side-walls, each conduit-cover being formed with an outlet opening surrounded by an upwardly extending wall-portion, a closing-plate detachably secured upon said wall-portion, said plate being provided with a screw-threaded hole, and a screw-threaded plug removably arranged in said hole, combined with floor-beams and floor-boards, and floor-covers detachably secured to said floor-beams directly over each conduit-cover, each floor-cover being formed with an opening, a plate detachably secured over the opening in each floor-cover, each plate being provided with a screw-threaded hole, and a screw-threaded plug removably arranged in each hole, substantially as and for the purposes set forth.

42. A floor-conduit for buildings comprising a multiplicity of conduit-sections, each section consisting of a main body and side-walls, and being formed with open ends and an open top, laterally extending flanges at the upper edges of said side-walls, vertical flanges at the ends of each section, means for securing the vertical flanges of one section upon the vertical flanges of another section, a dividing wall extending upwardly from said main body, and a conduit-cover detachably secured upon the flanges of said side-walls, combined with floor-beams and floor-boards, and floor-covers detachably secured to said floor-beams directly over each conduit-cover, each floor-cover being formed with an opening, a plate detachably secured over the opening in each floor-cover, each plate being provided with a screw-threaded hole, and a screw-threaded plug removably arranged in each hole, substantially as and for the purposes set forth.

43. A floor-conduit for buildings comprising a multiplicity of conduit-sections, each section consisting of a main body and side-walls, and being formed with open ends and an open top, laterally extending flanges at the upper edges of said side-walls, vertical flanges at the ends of each section, means for securing the vertical flanges of one section upon the vertical flanges of another section, a dividing wall extending upwardly from said main body, and a conduit-cover detachably secured to said main body, and a conduit-cover detachably secured upon the flanges of said side-walls, each conduit-cover being formed with an outlet opening surrounded by an upwardly extending wall-portion, and a closing-plate detachably secured upon said wall-portion, combined with floor-beams and floor-boards, and floor-covers detachably secured to said floor-beams directly over each conduit-cover, each floor-cover being formed with an opening, a plate detachably secured over the opening in each floor-cover, each plate being provided with a screw-threaded hole, and a screw-threaded plug removably arranged in each hole, substantially as and for the purposes set forth.

44. A floor-conduit for buildings, comprising a multiplicity of conduit-sections, each section consisting of a main body and side-walls, and being formed with open ends and an open top, laterally extending flanges at the upper edges of said side-walls, vertical flanges at the ends of each section, means for securing the vertical flanges of one section upon the vertical flanges of another section, a dividing wall extending upwardly from said main body, a conduit-cover detachably secured upon the flanges of said side-walls, each conduit-cover being formed with an outlet opening surrounded by an upwardly extending wall-portion, a closing-plate detachably secured upon said wall-portion, said plate being provided with a screw-threaded hole, and a screw-threaded plug removably arranged in said hole, combined with floor-beams and floor-boards, and floor-covers detachably secured to said floor-beams directly over each conduit-cover, each floor-cover being formed with an opening, a plate detachably secured over the opening in each floor-cover, each plate being provided with a screw-threaded hole, and a screw-threaded plug removably arranged in each hole, substantially as and for the purposes set forth.

45. A floor-conduit for buildings comprising a multiplicity of rectangularly formed conduit-sections, T-shaped conduit-sections, and cross-shaped conduit-sections, each section being formed with open ends and an open top, means for securing said sections end to end, correspondingly formed conduit-covers detachably secured upon each section, each conduit-cover being formed with an outlet opening surrounded by an upwardly extending wall-portion, and a closing-plate detachably secured upon said wall-portion.

46. A floor-conduit for buildings comprising a multiplicity of rectangularly formed conduit-sections, T-shaped conduit-sections, and cross-shaped conduit-sections, each section being formed with open ends and an open top, means for securing said sections end to end, correspondingly formed conduit-covers detachably secured upon each section, each conduit-cover being formed with an outlet opening surrounded by an upwardly extending wall-portion, a closing-plate detachably secured upon said wall-portion, said plate being provided with a screw-threaded hole, and a screw-threaded plug removably arranged in said hole.

47. A floor-conduit for buildings comprising a multiplicity of rectangularly formed conduit-sections, T-shaped conduit-sections, and cross-shaped conduit-sections, each section consisting of a main-body and side-walls, and being formed with open ends and an open top, said sections being provided with dividing walls extending upwardly from the bodies of said sections, means for securing said sections end to end, a conduit-cover detachably secured upon each section, each conduit-cover being formed with an outlet opening surrounded by an upwardly extending wall-portion, and a closing-plate detachably secured upon said wall-portion.

48. A floor-conduit for buildings comprising a multiplicity of rectangularly formed conduit-sections, T-shaped conduit-sections, and cross-shaped conduit-sections, each section consisting of a main-body and side-walls, and being formed with open ends and an open top, said sections being provided with dividing walls extending upwardly from the bodies of said sections, means for securing said sections end to end, a conduit-cover detachably secured upon each section, each conduit-cover being formed with an outlet opening surrounded by an upwardly extending wall-portion, and a closing-plate detachably secured upon said wall-portion, said plate being provided with a screw-threaded hole, and a screw-threaded plug removably arranged in said hole.

49. A floor-conduit for buildings comprising a multiplicity of rectangularly formed conduit-sections, T-shaped conduit-sections, and cross-shaped conduit-sections, each section being formed with open ends and an open top, means for securing said sections end to end, and correspondingly formed conduit-covers detachably secured upon each section, combined with the floor-beams and floor-boards, and floor-covers detachably secured to said floor-beams, directly over each conduit-cover, substantially as and for the purposes set forth.

50. A floor-conduit for buildings comprising a multiplicity of rectangularly formed conduit-sections, T-shaped conduit-sections, and cross-shaped conduit-sections, each section being formed with open ends and an open top, means for securing said sections end to end, correspondingly formed conduit-covers detachably secured upon each section, each conduit-cover being formed with an outlet opening surrounded by an upwardly extending wall-portion, and a closing-plate detachably secured upon said wall-portion, combined with the floor-beams and floor-boards, and floor-covers detachably secured to said floor-beams, directly over each conduit-cover, substantially as and for the purposes set forth.

51. A floor-conduit for buildings comprising a multiplicity of rectangularly formed conduit-sections, T-shaped conduit-sections, and cross-shaped conduit-sections, each section being formed with open ends and an open top, means for securing said sections end to end, correspondingly formed conduit-covers detachably secured upon each section, each conduit-cover being formed with an outlet opening surrounded by an upwardly extending wall-portion, a closing-plate detachably secured upon said wall-portion, said plate being provided with a screw-threaded hole, and a screw-threaded plug removably arranged in said hole, combined with the floor-beams and floor-boards, and floor-covers detachably secured to said floor-beams, directly over each conduit-cover, substantially as and for the purposes set forth.

52. A floor-conduit for buildings comprising a multiplicity of rectangularly formed conduit-sections, T-shaped conduit-sections, and cross-shaped conduit-sections, each section being formed with open ends and an open top, means for securing said sections end to end, and correspondingly formed conduit-covers detachably secured upon each section, combined with the floor-beams and floor-boards, and floor-covers detachably secured to said floor-beams directly over each conduit-cover, each floor-cover being formed with an opening, and a plate detachably secured over the opening in each floor-cover, substantially as and for the purposes set forth.

53. A floor-conduit for buildings comprising a multiplicity of rectangularly formed conduit-sections, T-shaped conduit-sections, and cross-shaped conduit-sections, each section being formed with open ends and an open top, means for securing said sections end to end, correspondingly formed conduit covers detachably secured upon each section, each conduit-cover being formed with an outlet opening surrounded by an upwardly extending wall-portion, and a closing-plate detachably secured upon said wall-portion, combined with the floor-beams and floor-boards, and floor-covers detachably secured to said floor-beams directly over each conduit-cover, each floor-cover being formed with an opening, and a plate detachably secured over the opening in each floor-cover, substantially as and for the purposes set forth.

54. A floor-conduit for buildings comprising a multiplicity of rectangularly formed conduit-sections, T-shaped conduit-sections, and cross-shaped conduit sections, each section being formed with open ends and an open top, means for securing said sections end to end, correspondingly formed conduit-covers detachably secured upon each section, each conduit-cover being formed with an outlet opening surrounded by an upwardly extending wall-portion, a closing-plate detachably secured upon said wall portion, said plate being provided with a screw threaded hole, and a screw-threaded plug removably arranged in said hole, combined with the floor-beams and floor-boards, and floor-covers detachably secured to said floor-beams directly over each conduit-cover, each floor-cover being formed with an opening, and a plate detachably secured over the opening in each floor-cover, substantially as and for the purposes set forth.

55. A floor-conduit for buildings comprising a multiplicity of rectangularly formed conduit-sections, T-shaped conduit-sections, and cross-shaped conduit-sections, each section being formed with open ends and an open top, means for securing said sections end to end, and correspondingly formed conduit-covers detachably secured upon each section, combined with floor-beams and floor boards, and floor-covers detachably secured to said floor-beams directly over each conduit-cover, each floor-cover being formed with an opening, a plate detachably secured over the opening in each floor-cover, each plate being provided with a screw-threaded hole, and a screw-threaded plug removably arranged in each hole, substantially as and for the purposes set forth.

56. A floor-conduit for buildings comprising a multiplicity of rectangularly formed conduit-sections, T-shaped conduit sections, and cross-shaped conduit-sections, each section being formed with open ends and an open top, means for securing said sections end to end, correspondingly formed conduit-covers detachably secured upon each section, each conduit cover being formed with an outlet opening surrounded by an upwardly extending wall-portion, and a closing-plate detachably secured upon said wall-portion, combined with floor-beams and floor-boards, and floor-covers detachably secured to said floor-beams directly over each conduit-cover, each floor-cover being formed with an opening, a plate detachably secured over the opening in each floor-cover, each plate being provided with a screw-threaded hole, and a screw-threaded plug removably arranged in each hole, substantially as and for the purposes set forth.

57. A floor-conduit for buildings comprising a multiplicity of rectangularly formed conduit-sections, T-shaped conduit-sections, and cross-shaped conduit-sections, each section being formed with open ends and an open top, means for securing said sections end to end, correspondingly formed conduit-covers detachably secured upon each section, each conduit-cover being formed with an outlet opening surrounded by an upwardly extending wall-portion, a closing-plate detachably secured upon said wall-portion, said plate being provided with a screw-threaded hole, and a screw-threaded plug removably arranged in said hole, combined with floor-beams and floor-boards, and floor-covers detachably secured to said floor-beams directly over each conduit-cover, each floor-cover being formed with an opening, a plate detachably secured over the opening in each floor-cover, each plate being provided with a screw-threaded hole, and a screw-threaded plug removably arranged in each hole, substantially as and for the purposes set forth.

In testimony that I claim the invention set forth above I have hereunto set my hand this first day of December 1908.

CHARLES W. WACHTEL, Jr.

Witnesses:
 FREDK. C. FRAENTZEL,
 FREDK. H. W. FRAENTZEL.